June 25, 1929.  C. M. MURPHY  1,718,828
DISPLAY DEVICE
Filed July 28, 1927
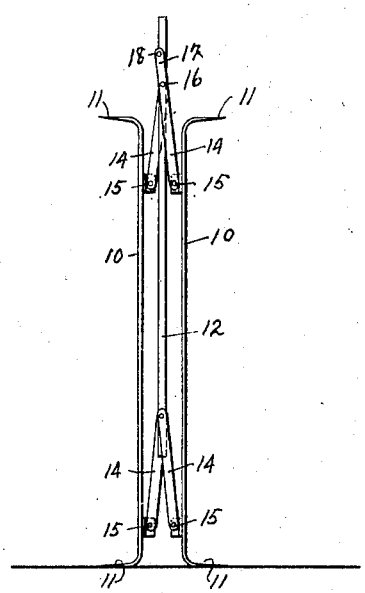
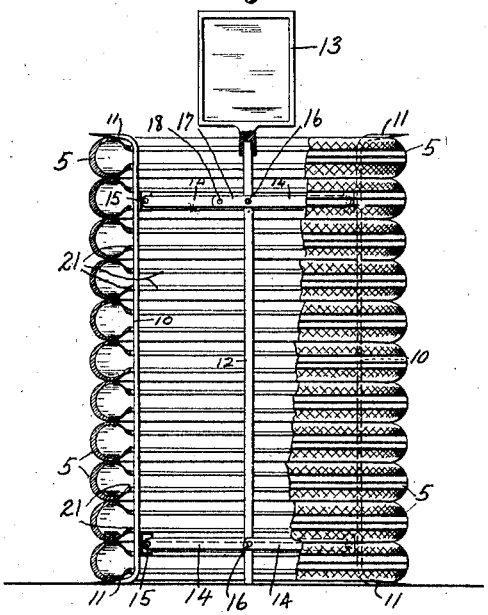
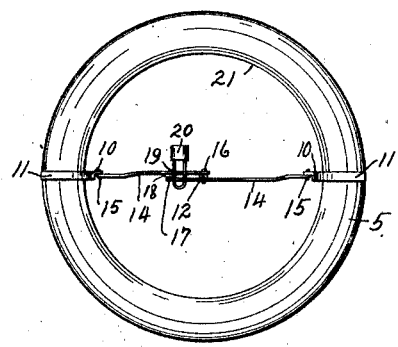
INVENTOR
Clement M. Murphy
BY
Erwin, Wheeler & Woolard
ATTORNEYS Patented June 25, 1929.

1,718,828

UNITED STATES PATENT OFFICE.

CLEMENT M. MURPHY, OF MILWAUKEE, WISCONSIN.

DISPLAY DEVICE.

Application filed July 28, 1927. Serial No. 208,984.

My invention relates to improvements in display devices.

Heretofore the practice of displaying automobile tires at points outside of the range of view of the person in charge of a tire store has been extremely hazardous by reason of the easy theft of single tires from a row or pile of casings. Chain locks for such piles of tires are inconvenient and each of the tires upon the pile must be separately handled if the exhibit is to be moved into or out of the tire store when the store is opened or closed. Furthermore a chain and lock unnecessarily inconveniences the salesman each time a tire is to be sold from the pile.

I have, therefore, provided a device which will not only securely lock the tires together and prevent thefts, but I have also provided a most convenient rack upon which to mount the tires for easy handling of the entire pile.

I have also provided a rack which will fold into a package of small dimensions when not in use.

In the drawings:—

Figure 1 is a view of my display rack in folded position.

Figure 2 is a view of my rack showing its installation in position for locking a pile of tires.

Figure 3 is a top view of a pile of tires secured and locked by my display rack.

Like parts are identified by the same reference characters throughout the several views.

My display device comprises a plurality of side members 10 with projecting grapples at either end thereof. The side members may be made of angle iron as indicated in the drawings or of any other strong, light material, and the grapples may be made integral therewith or formed separately and secured at either end of the side arms. The grapples should be amply long to securely retain the tires 5 as indicated in Figure 2.

A central column or locking staff 12 provided with a handle 13 provides a control for positioning the side arms 10 by means of toggle arms 14 which are pivotally connected to the side arms at 15 and to the staff at 16.

One of the toggle arms at the top of the display rack is provided at 17 with an extension beyond the staff 12 to form a locking strap which is apertured at 18 to conform with an aperture at 19 in the corresponding toggle arm on the other side of the staff. When the display device is in operation and tires are to be locked thereon the toggle arms may be locked by means of a padlock 20 as shown in Figure 3.

To operate the device for locking or displaying a number of tires such as those shown in Figure 2, the folded device as in Figure 1 is thrust through the pile and is opened to engage the grapples at the bottom and top of the pile, the toggle arms 14 being actuated by the continued downward thrust of the staff 12 until the side arms are thrust tightly against the beads 21 of the tires and the toggle arms are in approximately perpendicular relation to the staff 2. Locking of the keeper of the padlock through apertures 18 and 19 will then secure the device in place.

Easy handling of a number of tires is assured through use of my device for the entire displayed group may be rolled along in the same manner that barrels are handled, thus obviating the necessity for handling the tires individually or in pairs when the tires are taken to or from the show window or platform.

The handle 13 may be enlarged as shown to provide advertising space for a card on which to list prices and sizes of tires exhibited in my display rack.

I claim:

1. In a display rack, side arms provided with spaced grapples, a staff provided with toggle arms for forcing the side arms outwardly a predetermined distance from the staff, said toggle arms being adapted when in opened position to lap past each other, and apertures in said toggle arms so positioned as to register with one another to permit insertion of a padlock keeper whereby to prevent closing of said toggle arms.

2. In a display rack, a staff, diverging toggle arms pivotally mounted in pairs at spaced points on said staff, side arms pivotally secured to the outer ends of the toggle arms, grapples at the ends of the side arms, and means for locking the rack when adjusted in display position, said rack having foot pieces to support the displayed contents from a floor, and the staff thereof having a free upper end adapted to support an advertising sign.

CLEMENT M. MURPHY.